Oct. 16, 1934.  C. G. BUTLER  1,977,540
JOINT
Filed March 4, 1931
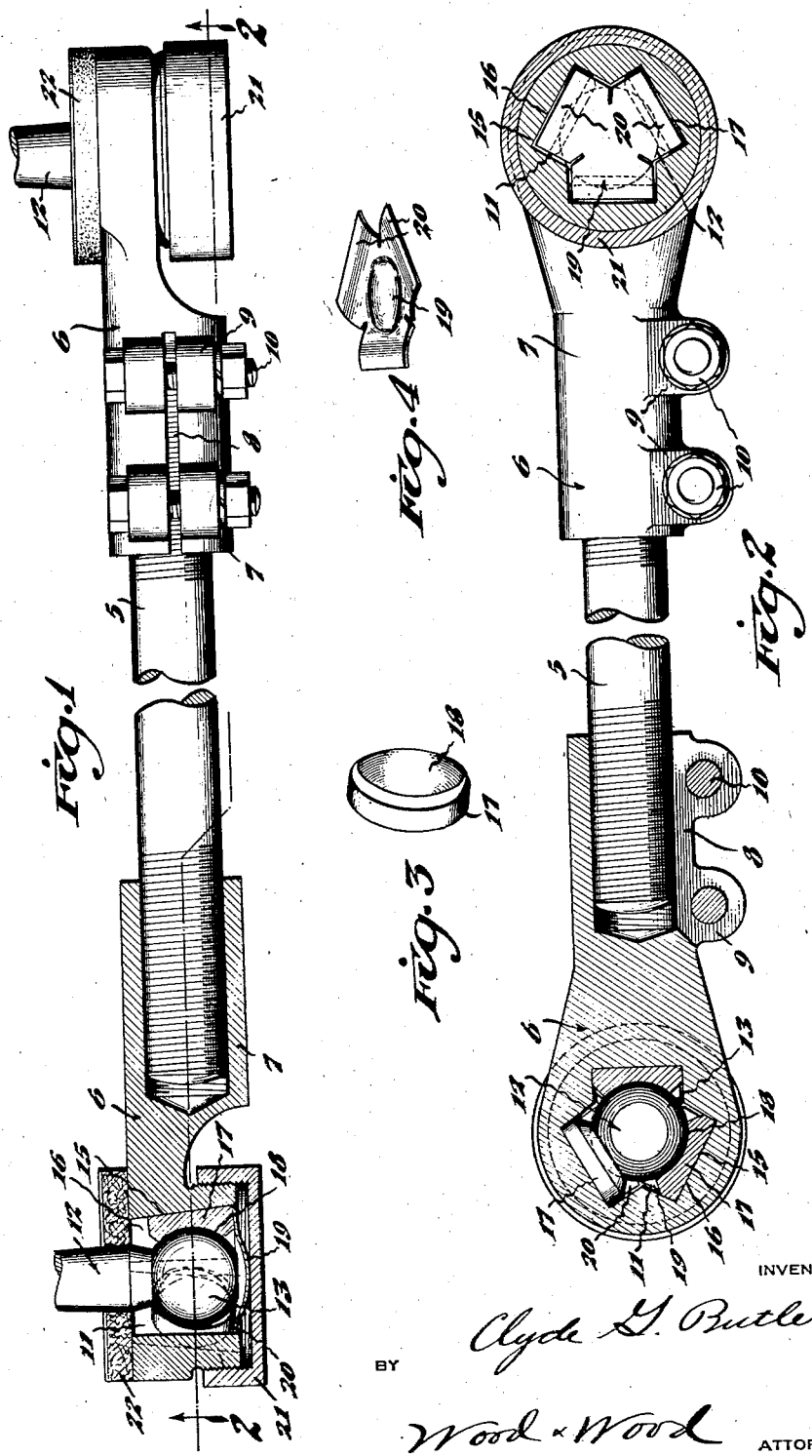
INVENTOR
Clyde G. Butler
BY
Wood & Wood  ATTORNEYS Patented Oct. 16, 1934

1,977,540

UNITED STATES PATENT OFFICE 1,977,540

JOINT

Clyde G. Butler, Cincinnati, Ohio, assignor, by mesne assignments, to Thompson Products, Incorporated, Cleveland, Ohio, a corporation of Ohio Application March 4, 1931, Serial No. 519,974

1 Claim. (Cl. 287—90)

This invention relates to connection means or joints of the type designed for flexibly connecting a tie rod, reach rod, drag link, etc. to the part which it is actuated by or actuates. The particular type of joint to which this invention relates is further described as a ball and socket connection. These devices have heretofore been provided with means for tightening the same to compensate for wear, since they are used, to a great extent, in environments where it is of the utmost importance that there be a snug fit between the socket and the ball to prevent play or vibration between the parts.

It has always been the practice to provide a manually operated means for adjusting the parts to bring the ball into closer contact with the casing or its contained seats. These adjustments have been made periodically as it became evident to the mechanic or to the user of the device that the parts were becoming loose.

It is the object of the present invention to provide an automatically operated wear compensating device or adjustment means for the ball and socket joint whereby the parts are urged into snug uniform contact and the device is effective for this purpose without unduly binding the ball in the socket.

It is another object of this invention to provide that the wear compensating device is effective for constant uniform contact of the bearing seats of the casing with the ball despite continuous wear take-up over a long period of use, and wherein the relation of the parts continues to be maintained in such fashion that no binding can take place.

Other objects and further advantages will be more fully set forth in a description of the accompanying drawing, in which:

Figure 1 is a side elevation of a connecting rod showing a joint of the present invention at each end thereof with one of the joints shown in longitudinal section for illustrating the internal parts thereof.

Figure 2 is a sectional view taken on line 2—2, Figure 1.

Figure 3 is a perspective view of one of the bearing seats employed in the joint.

Figure 4 is a perspective view of the yieldable means for urging the seats against the ball for automatic wear compensation.

The design of joint herein concerned may be attached to the end of the connecting rod in any conventional manner. The casing incorporating the socket in which the ball element of the joint is disposed, includes at its outer end a bore disposed transverse to the rod. This bore is of irregular design, being constituted by a plurality of plane surfaces, but includes the general characteristic of being tapered to one end, that is to say, the plane walls or surfaces converge or are inclined to that end.

The bearing seats, of which there may be a plurality, depending on the number of plane walls, are located on these inclined plane surfaces and are moved down the same against the ball, which is engaged or substantially surrounded by the seats, by means of a yieldable device and appropriate assembly means.

Referring specifically to the drawing, the connecting rod, indicated at 5, is in the form of a plain rod having screw threads at each end. A joint of this invention is attached to each end of the rod. Each joint comprises a casing 6 screwed onto the end of the rod. The shank 7 of the casing or the portion directly engaged on the rod is longitudinally slotted as at 8 and is provided with sets of ears 9, the ears of each set being adjacently disposed at the respective sides of the slot. Clamping bolts 10 are disposed through the adjacent ears for tightening or binding the casing on the rod after it has been screwed into its proper position thereon, which adjustment is made depending on the distance desired or rod length between the centers of the ball studs within the respective joints.

The casing 6 is provided at its outer end with the aforesaid bore which is indicated at 11. The ball stud 12 has its ball end 13 disposed within the bore and is axially aligned therewith, the shank or stud proper preferably extended from the small end of the tapered bore. The tapered bore described specifically includes a plurality of plane surfaces 15 converging generally toward one end of the bore, (see Figure 2). To define these inclined surfaces, the bore may be described as being slotted or grooved, the bases of the grooves constituting the aforesaid surfaces.

These grooves in addition to providing the plane inclined surfaces, provide guideways 16 for definitely maintaining the seats in a track which is longitudinal of the stud. Each seat 17 is in the form of a disc having a concave inner face 18 formed on a radius corresponding to that of the ball and therefore snugly engaging the particular side of the ball. The back of each disc is a plane surface.

The discs are of a diameter which is very slightly less than the width of the grooves and sufficient to permit a sliding fit for easy movement along the groove. Since the discs are circular they are free to rotate on their axes relative to each other and the ball. In the present instance there are three of these grooves and seats disclosed, but this is merely mentioned as one embodiment of the invention and it is understood that a plurality is broadly intended.

A plate spring 19 is engaged against the seats at the large end of the bore. This plate spring is of bowed form or cup-shaped and includes tangs or radial extensions 20, one for each seat. The extensions fit within the respective grooves of the casing whereby the plate may unflex and the tangs or extensions move down the guideways against the seats as wear takes place. The spring is held in place by means of a cap or closure means 21 which is screw threaded exteriorly onto the end of the transverse portion of the socket casing.

Any sort of sealing enclosure may be provided over the small end of the bore such as a felt washer 22, this washer being held in place by any means, not shown, which may be associated with the stud and the parts to which it is connected. It is preferable to dispose the tie rod and joints in the position illustrated wherein the small end of the bore is disposed upwardly and the weight of the rod and joints as hung on the balls is effective for urging the casings downwardly on the seats and the seats into closer engagement with the balls, the springs being effective for preventing dislodgment of the seats during shaking or vibration.

Inasmuch as these devices are usually placed in a moving environment and are subject to constant shaking, the spring is effective for continually resetting the seats down the inclines and against the ball. The incline adopted is gradual and has been selected to cause a moderate amount of inward movement for the seats without being so great as to permit the thrusts from the ball to become too greatly effective for moving the seats out of the incline or against the spring.

It is of the utmost importance that the seats cannot float or revolve around the bore and the ball since this action coupled with the spring urged movement of the seats would cause a wedging or clamping action which would be greatly detrimental to the free movement of the ball.

The seats are independently rotatable on their own axis relative to the ball and within the guideways. This distributes the wear uniformly around the concave contact portions of the seats.

Having described the invention, I claim:

In a ball and socket joint, a socket casing including a bore, said bore constituted by a plurality of grooves, the bottom surfaces of which grooves are plane, said bottom surfaces of the respective grooves converging generally toward one end of the bore, a bearing seat disposed in each groove, said seats of circular form and rotatable on their own axis within their particular grooves and having concave depressions in their inner faces adapted to engage the respective adjacent sides of the ball, and yieldable means for urging the seats toward the small end of the bore.

CLYDE G. BUTLER.